US011643905B2

(12) United States Patent
Vick, Jr. et al.

(10) Patent No.: US 11,643,905 B2
(45) Date of Patent: May 9, 2023

(54) ELECTRIC SAFETY VALVE WITH ANNULUS/SECTION PRESSURE ACTIVATION

(71) Applicant: Halliburton Energy Services, Inc., Houston, TX (US)

(72) Inventors: James Dan Vick, Jr., Dallas, TX (US); Jimmie Robert Williamson, Carrollton, TX (US); Bruce Edward Scott, McKinney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 47 days.

(21) Appl. No.: 16/524,559

(22) Filed: Jul. 29, 2019

(65) Prior Publication Data
US 2020/0095843 A1 Mar. 26, 2020

(51) Int. Cl.
*E21B 34/04* (2006.01)
*E21B 34/06* (2006.01)
*F16K 31/06* (2006.01)
*F16K 5/08* (2006.01)

(52) U.S. Cl.
CPC ............ *E21B 34/04* (2013.01); *E21B 34/066* (2013.01); *F16K 5/08* (2013.01); *F16K 31/061* (2013.01)

(58) Field of Classification Search
CPC .......... E21B 34/04; E21B 34/066; F16K 5/08; F16K 31/061
See application file for complete search history.

(56) References Cited

U.S. PATENT DOCUMENTS

| 5,101,907 A | * | 4/1992 | Schultz | ................... E21B 23/04 166/386 |
|---|---|---|---|---|
| 8,393,386 B2 | | 3/2013 | Lake et al. | |
| 8,490,687 B2 | | 7/2013 | Scott et al. | |
| 9,010,448 B2 | | 4/2015 | Williamson, Jr. et al. | |
| 9,631,456 B2 | | 4/2017 | Vick, Jr. et al. | |
| 2002/0108747 A1 | | 8/2002 | Dietz et al. | |

(Continued)

FOREIGN PATENT DOCUMENTS

WO 2014188203 A1 11/2014

*Primary Examiner* — Matthew R Buck
(74) *Attorney, Agent, or Firm* — Scott Richardson; Parker Justiss, P.C.

(57) ABSTRACT

Provided is an electrically surface-controlled subsurface safety valve (ESCSSV). The ESCSSV, in one example, includes an outer housing comprising a central bore extending axially through the housing that is configured to convey production fluids there through. The ESCSSV, in this embodiment, further includes a valve closure mechanism disposed proximate a downhole end of the central bore, and a bore flow management actuator disposed in the central bore and configured to move between a closed state and a flow state to engage or disengage the valve closure mechanism to determine a flow condition of the production fluids through the central bore. The ESCSSV, in this embodiment, additionally includes an electric valve assembly fluidically coupled to the bore flow management actuator and configured to select between a section pressure or the annulus pressure to control the bore flow management actuator and determine the flow condition of production fluids through the central bore.

19 Claims, 12 Drawing Sheets

(56) References Cited

U.S. PATENT DOCUMENTS

| | | |
|---|---|---|
| 2003/0094285 A1* | 5/2003 | French .................... E21B 21/00 |
| | | 166/380 |
| 2003/0121665 A1 | 7/2003 | Trott et al. |
| 2009/0205833 A1 | 8/2009 | Bunnell et al. |
| 2011/0037004 A1 | 2/2011 | Lake et al. |
| 2011/0120728 A1 | 5/2011 | Lake et al. |
| 2011/0186303 A1 | 8/2011 | Scott et al. |
| 2013/0092396 A1 | 4/2013 | Webber et al. |
| 2013/0126154 A1 | 5/2013 | Williamson, Jr. et al. |
| 2013/0248203 A1 | 9/2013 | Scott et al. |
| 2015/0123808 A1 | 5/2015 | Vick, Jr. et al. |
| 2016/0138365 A1 | 5/2016 | Vick, Jr. et al. |

* cited by examiner

ELECTRIC SAFETY VALVE WITH ANNULUS/SECTION PRESSURE ACTIVATION

CROSS-REFERENCE TO RELATED APPLICATION

This application claims priority to International Application Number PCT/US2018/051968 filed on Sep. 20, 2018, entitled "ELECTRIC SAFETY VALVE WITH ANNULUS/SECTION PRESSURE ACTIVATION," which application is commonly assigned with this application and incorporated herein by reference in its entirety.

TECHNICAL FIELD

This application is directed, in general, to safety valves and, more specifically, to an electric surface-controlled subsurface safety valve, a method of operating an electric surface-controlled subsurface safety valve and a hydrocarbon production well.

BACKGROUND

Operations performed and equipment utilized in conjunction with a subterranean production well usually require a safety valve be set relatively deep in the production well to circumvent potential production mishaps that can occur with the producing well. For example, a safety valve may be set at a depth of 1,000 feet or more.

Most offshore hydrocarbon producing wells are required by law to include a surface-controlled subsurface safety valve (SCSSV) located downhole in the production string to shut off the flow of hydrocarbons in an emergency. These SCSSVs are usually set below the mudline in offshore wells. What is needed in the art is an improved SCSSV that does not encounter the problems of existing SCSSVs.

BRIEF DESCRIPTION

Reference is now made to the following descriptions taken in conjunction with the accompanying drawings, in which.

DETAILED DESCRIPTION

Figure 1:
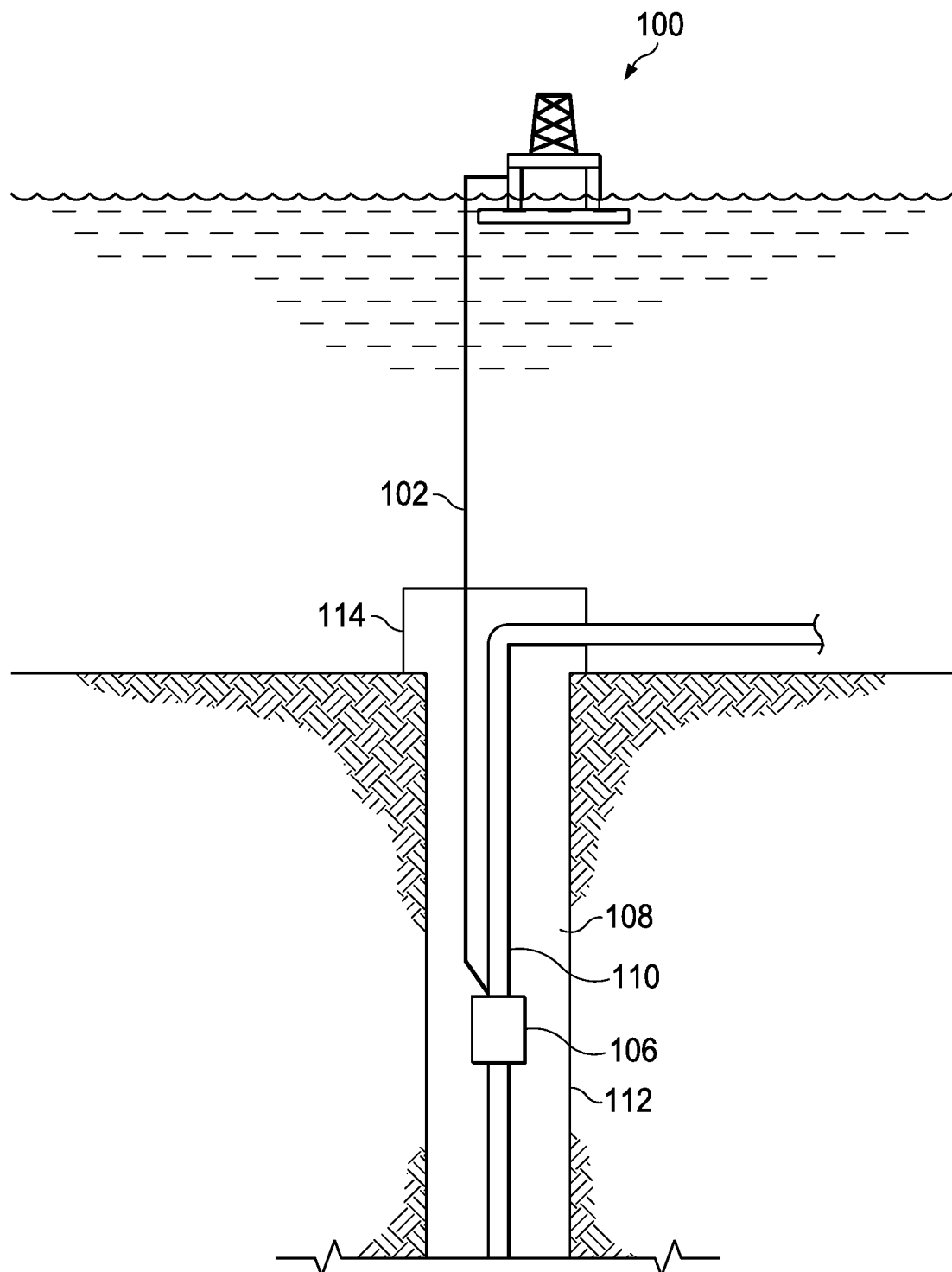
FIG. 1 illustrates a subterranean production well employing an electrically surface-controlled subsurface safety valve (ESCSSV) constructed according to the principles of the present disclosure.

The description and drawings included herein merely illustrate the principles of the disclosure. It will thus be appreciated that those skilled in the art will be able to devise various arrangements that, although not explicitly described or shown herein, embody the principles of the disclosure and are included within its scope. Furthermore, all examples recited herein are principally intended expressly to be for pedagogical purposes to aid the reader in understanding the principles of the disclosure and concepts contributed by the inventor to furthering the art, and are to be construed as being without limitation to such specifically recited examples and conditions. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated. Furthermore, directional terms, such as "above", "below", "upper", "lower", etc., are used only for convenience in referring to the accompanying drawings. Additionally, it is to be understood that the different embodiments of the present disclosure may be utilized in various orientations, such as inclined, inverted, horizontal, vertical, etc., and in various configurations, without departing from the principles of the present disclosure.

The present disclosure has acknowledged that offshore wells are being drilled at ever increasing water depths and in environmentally sensitive waters. Accordingly, the present disclosure recognizes that it is desirable to electrically control these safety valves to eliminate the need for hydraulic fluids and be able to control the safety valves at virtually unlimited water depths. Moreover, in these well environments, typical downhole surroundings such as pressure, temperature, salinity, pH levels and vibration levels usually vary and are demanding from a design standpoint as well as operationally. The present disclosure has further acknowledged that the operating environment is often corrosive and may include chemicals dissolved in or carried by the hydrocarbons or injected chemicals (e.g., hydrogen sulfide or carbon dioxide).

Given the foregoing acknowledgements, the present disclosure has recognized that electrically surface-controlled subsurface safety valves (ESCSSV) address many of the problems the industry encounters. The present disclosure has further recognized that their deployment may encounter a large number of compromises. These compromises include, for example, limited tool sizes (4.5 inch and 5.5 inch diameter tools), hybrid electric package designs limited to thick wall tools (large outside diameter or small inside diameter), upper operating temperature limited by any motor or electronics usage, prohibitive tool cost and reliability issues due to a harsh operating environment.

Embodiments of the present disclosure overcome the above compromises and can be readily designed for all typical safety valve sizes. Moreover, embodiments of the present disclosure do not require an electric motor or complex electronics, can accommodate much thinner tool wall thicknesses, may require a lower operating temperature, provide a simpler and reduced cost tool with optional electromagnet redundancy provided by one or more electric brakes, provide an electrically activated surface-controlled capability that routes pertinent pressures to a moveable piston structure, and provide a combination of failsafe operating conditions.

ESCSSVs according to the disclosure may be actuated using well pressure without the need for additional hydraulic control and balance lines. By eliminating hydraulic control and balance lines, the ESCSSV may have increased failsafe ability as compared to other safety valves. Failsafe may be defined as a condition in which the valve or associated control system may be damaged and the electrically actuated safety valve retains the ability to close. In some examples, the ESCSSV may fail in a closed position (e.g., closed state), thus ensuring that wellbore fluids and pressure are contained. In another example, the ESCSSV may close automatically when an electrical connection to the surface is damaged or severed without any additional external input.

FIG. 1 illustrates an offshore platform 100 connected to an ESCSSV 106 via electrical connection 102. An annulus 108 may be defined between walls of well 112 and a conduit 110. Wellhead 114 may provide a means to hand off and seal conduit 110 against well 112 and provide a profile to latch a subsea blowout preventer to. Conduit 110 may be coupled to wellhead 114. Conduit 110 may be any conduit such as a casing, liner, production tubing, or other tubulars disposed in a wellbore.

The ESCSSV 106 may be interconnected in conduit 110 and positioned in well 112. Although the well 112 is depicted in FIG. 1 as an offshore well, one of ordinary skill should be able to adopt the teachings herein to any type of well including onshore or offshore. Electrical connection 102 may extend into the well 112 and may be connected to the ESCSSV 106. Electrical connection 102 may provide power to one or both of an electrical valve assembly or an electromagnet, both of which may form a portion of the ESCSSV 106. As will be described in further detail below, power provided to the electrical valve assembly may cause the valve to switch between an annulus pressure and a section pressure, and thus actuate or de-actuate the ESCSSV 106. As will also be described in further detail below, power provided to the electromagnet may energize the electromagnet to hold components of the ESCSSV 106 in place, and thus actuate or de-actuate the ESCSSV 106. Actuation may comprise opening the ESCSSV 106 to provide a flow path for wellbore fluids to enter conduit 110, and de-actuation may comprise closing the ESCSSV 106 to close a flow path for wellbore fluids to enter conduit 110.

Figure 2A:
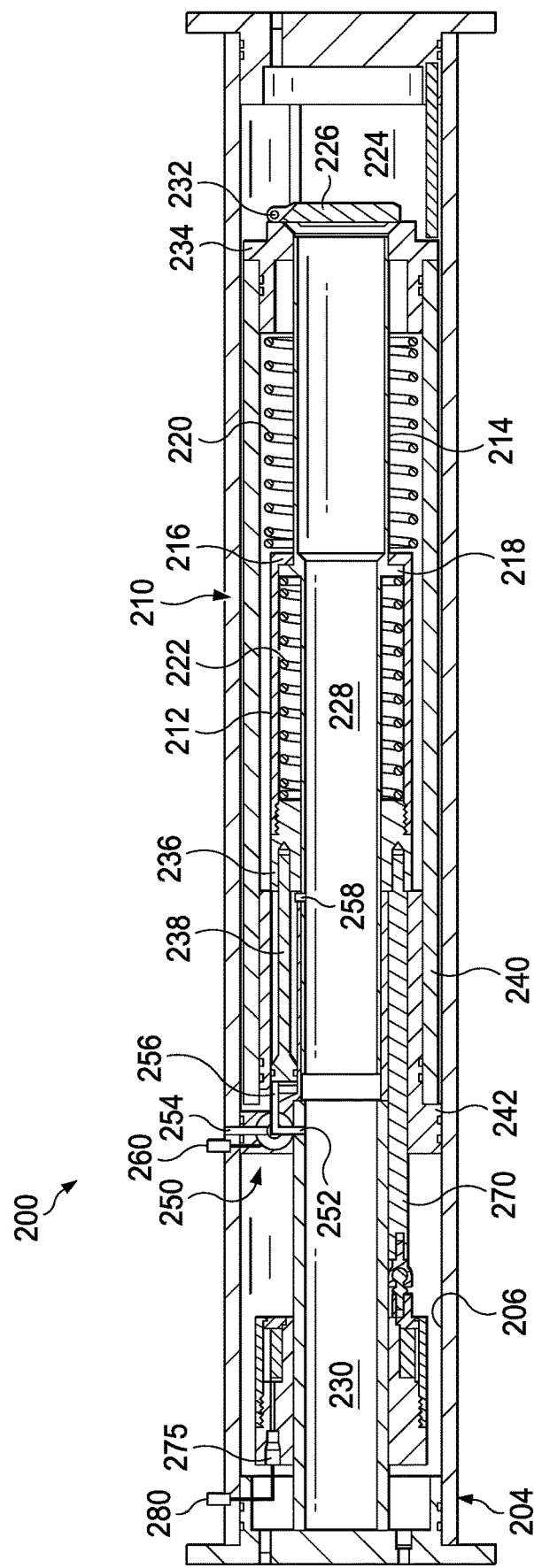
FIGS. 2A-2C illustrate different operational states of an ESCSSV manufactured according to the principles of the present disclosure, as may be employed in FIG. 1.

Referring to FIG. 2A, an example of an ESCSSV 200 is illustrated in a first closed position. The ESCSSV 200 illustrated in FIG. 2A initially includes an outer housing 204. The outer housing 204, in this embodiment, defines a central bore 206 extending axially there through. Located within the outer housing 204 is a bore flow management actuator 210 that is configured to move between a closed state (e.g., FIGS. 2A-2B) and an open state (e.g., FIG. 2C). In the illustrated embodiment of FIG. 2A, the actuator 210 includes a sliding sleeve 212 and flow tube 214, that are positioned such that a sliding sleeve shoulder 216 and flow tube shoulder 218 are in contact, and power spring 220 and nose spring 222 are fully extended. In the first closed state, sliding sleeve 212 may be referred to as being in a first position and flow tube 214 may be referred to as being in a first position.

The ESCSSV 200 may be disposed in a wellbore as part of a wellbore completion string. The wellbore may penetrate an oil and gas bearing subterranean formation such that oil and gas within the subterranean formation may be produced. A lower section 224 may be directly exposed to formation fluids and pressure by being in fluid communication with fluids present in the wellbore. Lower section 224 may be part of a production tubing string disposed of in the wellbore, for example. A valve closure mechanism 226 may isolate the lower section 224 from the actuator 210 (e.g., flow tube 214), which may prevent formation fluids and pressure from flowing into flow tube 214 when valve closure mechanism 226 is in a closed state. Valve closure mechanism 226 may be any type of valve such as a flapper type valve or a ball type valve. FIG. 2A illustrates the valve closure mechanism 226 as being a flapper type valve. As will be illustrated in further detail below, the valve closure mechanism 226 may be actuated into an open state to allow formation fluids to flow from lower section 224 through a flow path 228 defined by an interior of a flow tube 214 and through interior of a conduit 230, wherein it may then travel to the surface.

When the ESCSSV 200 is in the first closed state, no amount of differential pressure across valve closure mechanism 226 will allow wellbore fluids to flow from lower section 224 into flow path 228. In the instance that pressure is increased in conduit 230 above the pressure in lower section 224, the valve closure mechanism 226 may open when the pressure in conduit 230 is high enough to overcome a spring force from flapper spring 232. The orientation of the valve closure mechanism 226 may allow well treatment fluids to be pumped from a surface, such as a wellhead, into lower section 224 and into the subterranean formation. Once pressure in conduit 230 decreases, flapper spring 232 may cause valve closure mechanism 226 to return to the closed position, and thus flow from the lower section 224 into the flow path 228 may be prevented. Should a pressure differential across the valve closure mechanism 226 be reversed such that pressure in the lower section 224 is greater than a pressure in the conduit 230, the valve closure mechanism 226 may remain in a closed position and not allow fluids in the lower section 224 to flow into the conduit 230 via the flow path 228.

The power spring 220 may be disposed between a valve assembly 234 and the sliding sleeve shoulder 216. As illustrated in FIG. 2A, the sliding sleeve shoulder 216 and the flow tube shoulder 218 may be in contact when the ESCSSV 200 is in the first closed state. Power spring 220 may provide a positive spring force against the sliding sleeve shoulder 216 which may keep the flow tube 214 in the first position. Power spring 220 may also provide a positive spring force to return the flow tube 214 and the sliding sleeve 212 to the first position from a second position as will be explained below. The nose spring 222 may be disposed between the sliding sleeve assembly 236 and the flow tube shoulder 218. Sliding sleeve 212 and the sliding sleeve assembly 236 may be fixedly attached to allow the sliding sleeve 212 to move when a force is applied to the sliding sleeve assembly 236 from the nose spring 222 or from the piston 238. Nose spring 222 may provide a positive spring force against the sliding sleeve assembly 236 and the flow tube shoulder 218, which may move the flow tube 214 from a first position to a second position. Nose spring 222 may also provide a positive spring force which may move the sliding sleeve 212 from the second position to the first position. The above described components may be disposed within a sleeve 240 which may be fixedly attached to the valve assembly 234. Sleeve 240 may be fixedly attached to the outer housing 204 through the body assembly 242.

Figure 2B:
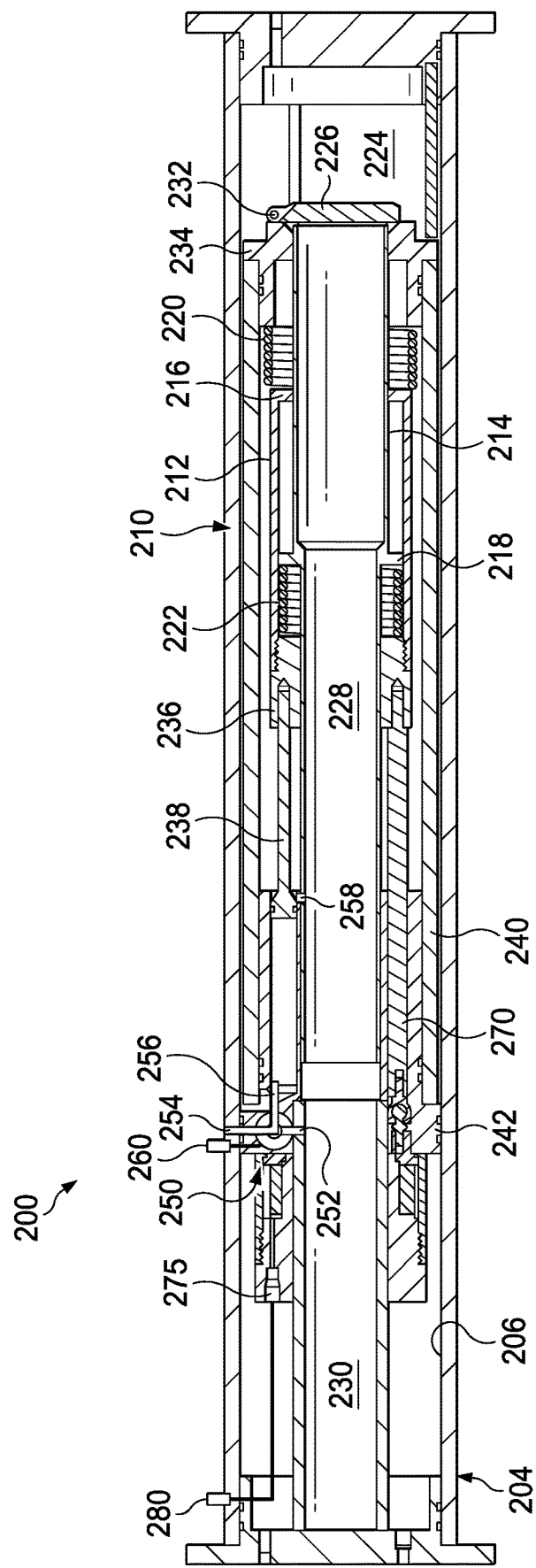

With reference to FIG. 2B, the ESCSSV 200 is illustrated in a second closed state. In the second closed state, the sliding sleeve 212 may be displaced from the first position to a second positon relatively closer in proximity to the valve closure mechanism 226. Flow tube 214 may translate downward until contacting the valve closure mechanism 226. When the ESCSSV 200 is in the second closed state, both the power spring 220 and the nose spring 222 may be in a compressed state.

To move the sliding sleeve 212 to the second position, a differential pressure may be created across an uphole portion and downhole portion of the piston 238. For example, an electric valve 250 could be used to create a higher pressure on an uphole portion of the piston 238 than exists on a downhole portion of the piston 238, thereby creating a force to urge the piston 238 downward. The piston 238 may transfer the force through the sliding sleeve assembly 236 into the sliding sleeve shoulder 216. When the differential pressure across the piston 238 is increased the pressure force exerted on piston 238 may be increased. When the differential pressure across the piston 238 is increased beyond the spring force provided by the nose spring 222 and the power spring 220, the nose spring 222 and the power spring 220 may compress and allow the sliding sleeve 212 to move into the second position and the flow tube 214 to contact valve closure mechanism 226.

In accordance with the disclosure, the pressure differential across the piston 238 may be created using the electric valve assembly 250. In this embodiment, the electric valve assembly 250, along with a section pressure channel 252, annulus pressure channel 254, upper piston channel 256, and lower piston channel 258 may be used to create the aforementioned force upon the piston 238. For example, in the particular embodiment of FIGS. 2A-2C, the section pressure (e.g., that pressure in the conduit 230) is naturally less than the annulus pressure (e.g., that pressure outside of the outer housing 204). Accordingly, the electric valve assembly 250 could move from a position wherein the upper piston channel 256 is coupled to the section pressure channel 252, and thus where no differential pressure exists across the piston 238 as shown in FIG. 2A, to a position wherein the upper piston channel 256 is coupled to the higher annulus pressure via the annulus pressure channel 254, and thus where a differential pressure exists across the piston 238 as shown in FIG. 2B. In the illustrated embodiment, electric control line 260 extends from the surface of the well to control and/or power the electric valve assembly 250.

In the second closed state, ESCSSV 200 remains safe as no fluids from lower section 224 can flow into flow tube 214. In the second closed state no amount of differential pressure across the valve closure mechanism 226 should cause valve closure mechanism 226 to open to allow fluids from the lower section 224 to flow into the flow path 228. If pressure is increased in the conduit 230, the sliding sleeve 212 may move back to the first position illustrated in FIG. 2A. Unlike conventional safety valves which generally require a control line to supply pressure to actuate a piston to move a sliding sleeve, ESCSSV 200 in certain embodiments only requires pressure supplied from the section pressure or annulus pressure to move the sliding sleeve 212.

With continued reference to FIG. 2B, the connector rod 270 may be fixedly attached to sliding sleeve assembly 236 and a brake assembly (e.g., electromagnet assembly 275 in one embodiment). In the embodiment shown and discussed, the brake assembly is configured as the electromagnet assembly 275, but other brakes are within the scope of the disclosure. In the illustrated embodiment, electric control line 280 extends from the surface of the well to control and/or power the electromagnet assembly 275. As illustrated, when the sliding sleeve 212 is moved from the first position to the second position, the connector rod 270 and the electromagnet assembly 275 may also be moved. At a time before, between, or after the sliding sleeve 212 is allowed to come to the second position, the electromagnet assembly 275 may be powered on. Powering the electromagnet assembly 275 may cause the electromagnet assembly 275 to become fixed in place with the body assembly 242, or another magnetic part of the ESCSSV 200. The electromagnet assembly 275 may be attached to the sliding sleeve assembly 236 through connector rod 270. When the electromagnet assembly 275 is fixed in place, the body assembly 236 and the sliding sleeve 212 may also become fixed in place. Powering the electromagnet assembly 275 may cause the sliding sleeve 212 to become fixed in the second position. Electromagnets may provide a means to hold the sliding sleeve 222 at any well depth. Hydraulic systems used in previous wellbore safety valves require control and balance lines to actuate and hold a valve open. Hydraulic systems may have limitations on operational depth whereas the electromagnet assembly 275 may not face the same challenges.

Figure 2C:
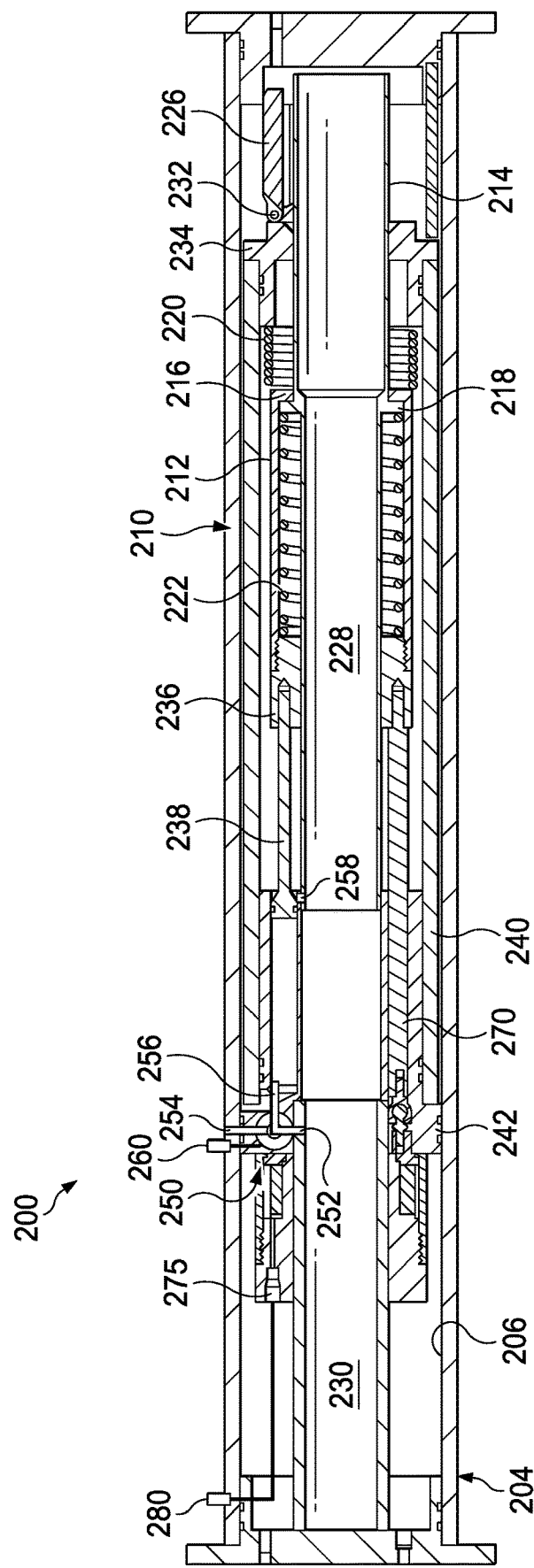

With reference to FIG. 2C, ESCSSV 200 is illustrated in an open state. When ESCSSV 200 is in the open state, the sliding sleeve 212 may be fixed in place in the second position (e.g., as shown in FIG. 2B) through the force provided by the electromagnet assembly 275. In this instance, the electromagnet assembly 275 transfers the force through connector rod 270 to the sliding sleeve assembly 236. Flow tube 214 is illustrated as being axially shifted from the first position illustrated in FIGS. 2A and 2B to a second position in FIG. 2C. When flow tube 214 is in the second position, the flow tube shoulder 218 and the sliding sleeve shoulder 216 may be in contact, and the flow tube 214 may have displaced the valve closure mechanism 226 into an open position. At the same time, the nose spring 222 may be in an uncompressed state while the power spring 220 may be in a compressed state.

Flow tube 214 may be moved from the first position to the second position when the sliding sleeve 212 is fixed in place in the second position. When the sliding sleeve 212 is fixed in the second position, the nose spring 222 may provide a positive spring force against the flow tube shoulder 218 and the sliding sleeve assembly 236. The positive spring force from the nose spring 222 may be transferred through the flow tube 214 into the valve closure mechanism 226. In the instance where the positive spring force from the nose spring 222 is greater than the differential pressure across the valve closure mechanism 226, the nose spring 222 may extend and move the flow tube 214 into the second position. Alternatively, if the positive spring force from the nose spring 222 is not greater than the differential pressure across valve closure mechanism 226, pressure in the conduit 230 may be increased until the pressure in the conduit 230 and the positive spring force from the nose spring 222 overcome the differential pressure across the valve closure mechanism 226. The positive spring force from the nose spring 222 may then move the flow tube 214 into the second position. When the flow tube 214 is in the second position, fluids such as oil and gas in the lower section 224 may be able to flow into the flow path 228 and to a surface of the wellbore such as to a wellhead. ESCSSV 200 may remain in the open position with the sliding sleeve 212 in the second position and the flow tube 214 in the second position as long as the electromagnet assembly 275 remains powered on.

ESCSSV 200 may be moved to the first closed position as illustrated in FIG. 2A by powering off the electromagnet assembly 275. As previously discussed, the electromagnet assembly 275 may fix the sliding sleeve 212 in place in the second position when the electromagnet assembly 275 remains powered on. When the electromagnet assembly 275 is powered off, the sliding sleeve 212 may no longer be fixed in place. Power spring 220 may provide a positive spring force against the valve assembly 234, the sliding sleeve shoulder 216, and the flow tube shoulder 218 through contact between the sliding sleeve shoulder 216 and the flow tube shoulder 218. Positive spring force from the power spring 220 may axially displace the sliding sleeve 212 and the flow tube 212 to the first position, and a positive spring force provided thereby returning the ESCSSV 200 to the first closed state illustrated in FIG. 2A. Positive spring force from the power spring 220 may axially displace the electromagnet assembly 275 to the position illustrated in FIG. 2A by transmitting the positive spring force through the connector rod 270.

Figure 3A:
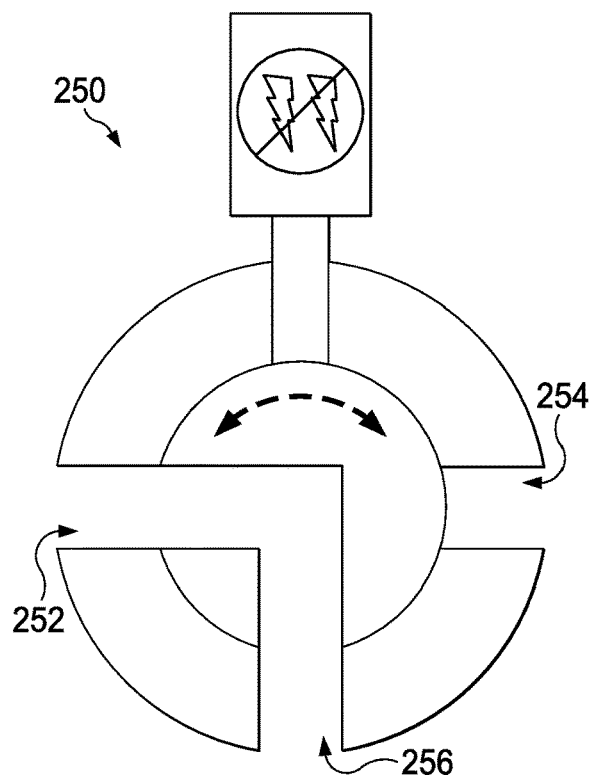
FIGS. 3A-3C illustrate different operational states of one valve assembly manufactured according to the principles of the present disclosure, as may be employed in FIGS. 2A-2C.
Figure 3B:
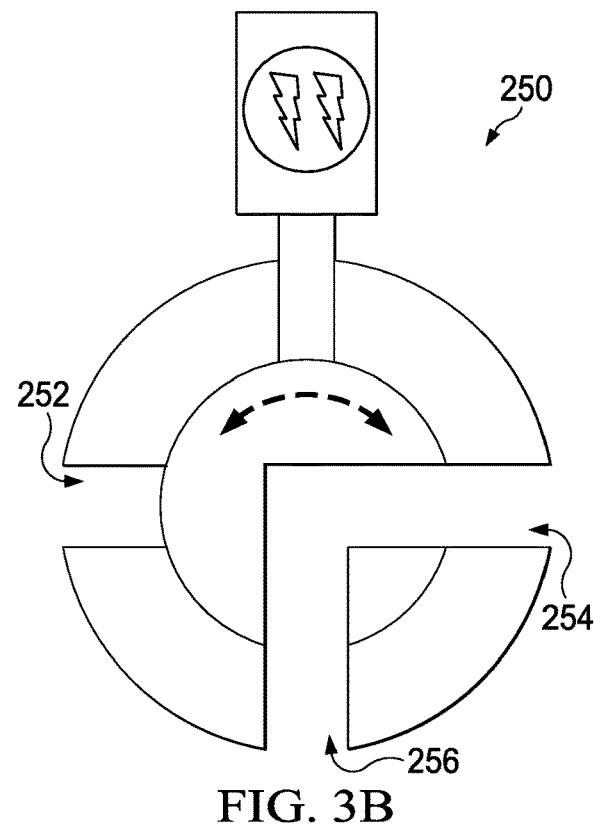
Figure 3C:
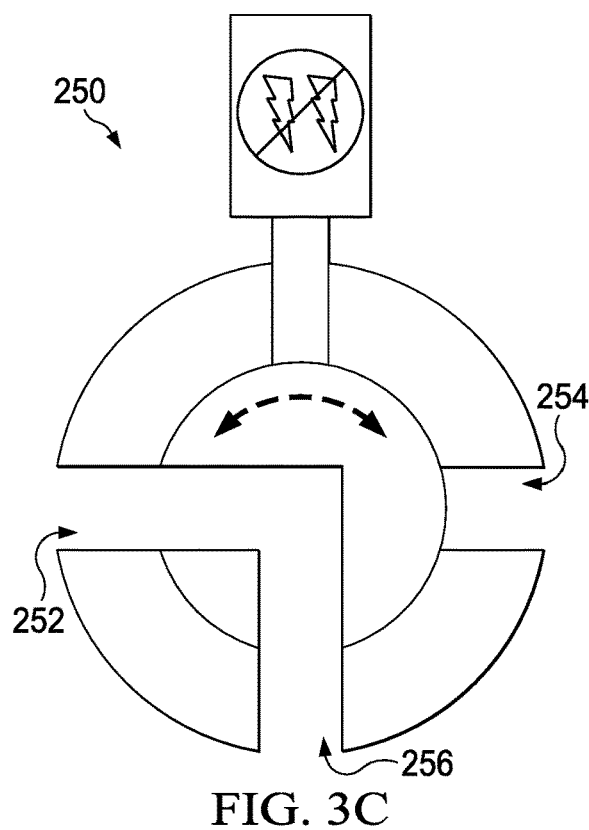

The electric valve assembly 250 may comprise many different configurations and remain within the scope of the disclosure. FIGS. 2A-2C illustrate one embodiment wherein the electric valve assembly 250 comprises a single three-way rotary valve. Turning briefly to FIGS. 3A-3C, illustrated is an enhanced view of the electric valve assembly 250 in the positions of FIGS. 2A-2C, respectively. For example, FIG. 3A illustrates the electric valve assembly 250 wherein the upper piston channel 256 is coupled to the section pressure channel 252, FIG. 3B illustrates the electric valve assembly 250 wherein the upper piston channel 256 is coupled to the annulus pressure channel 254, and FIG. 3C illustrates the electric valve assembly 250 wherein the upper piston channel 256 is again coupled to the section pressure channel 252. Note, in this embodiment, the electric valve assembly 250 only couples the upper piston channel 256 to the annulus pressure channel 254 when subjected to power (e.g., is in an energized state). Thus, when the electric valve assembly 250 is not subjected to power (e.g., is in a de-energized state), it automatically reverts to coupling the upper piston channel 256 to the section pressure channel 252.

Figure 4A:
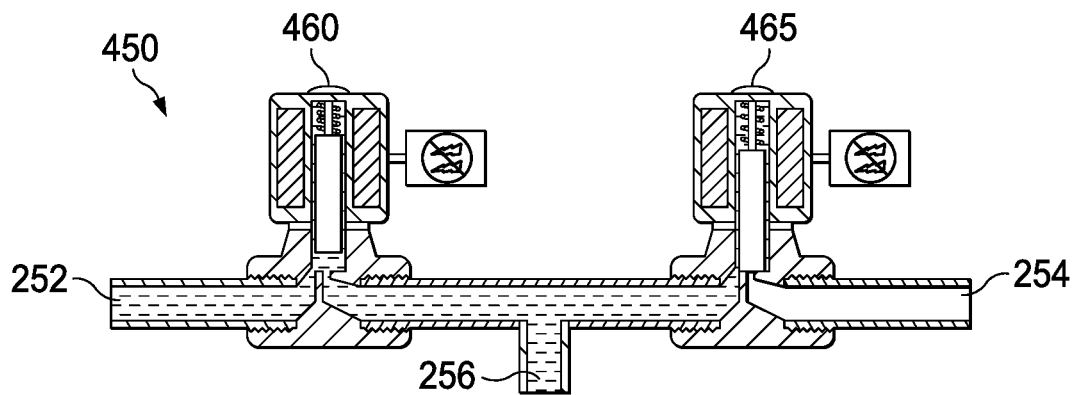
FIGS. 4A-4C illustrate different operational states of an alternative valve assembly manufactured according to the principles of the present disclosure, as may be employed in FIGS. 2A-2C.
Figure 4B:
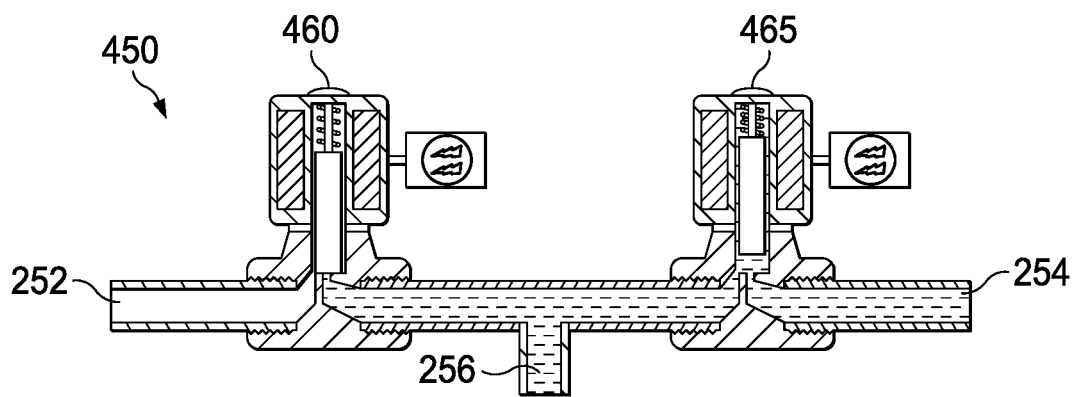
Figure 4C:
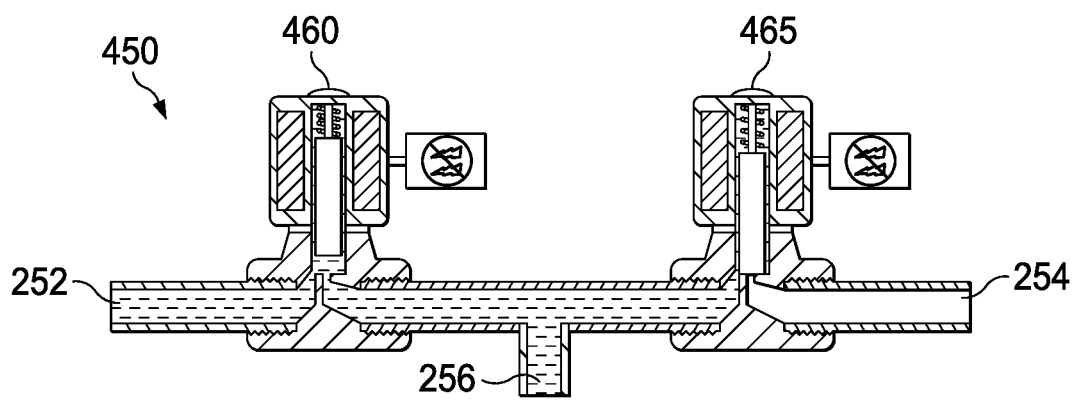

In an alternative embodiment, such as shown in FIGS. 4A-4C, the electric valve assembly 450 could comprise a pair of two-way direct acting valves. In this embodiment, a first of the two-way direct acting valves 460 could be a valve such that it is normally open when not subjected to power (e.g., in a de-energized state), but can be closed if it is subjected to power (e.g., in an energized state). This first two-way direct acting valve 460 would be coupled between the upper piston channel 256 and the section pressure channel 252 in this embodiment, as shown in FIGS. 4A-4C. In this embodiment, a second of the two-way direct acting valves 465 could be a valve such that it is normally closed when not subjected to power (e.g., in a de-energized state), but can be opened if it is subjected to power (e.g., in an energized state). This second two-way direct acting valve 465 would be coupled between the upper piston channel 256 and the annulus pressure channel 254 in this embodiment, as shown in FIGS. 4A-4C. Thus, when the first and second two-way direct acting valves 460, 465 are not subjected to power (e.g., de-energized), the upper piston channel 256 is subjected to the lower pressurized fluid from the section pressure channel 252 (e.g., as shown in FIGS. 4A and 4C), but when the first and second two-way direct acting valves 460, 465 are subjected to power (e.g., energized), the upper piston channel 256 is subjected to the higher pressurized fluid from the annulus pressure channel 252, thus urging the piston 238 (FIGS. 2A-2C) downhole. In accordance with the disclosure, if the first and second two-way direct acting valves 460, 465 lose power, the electric valve assembly 450 automatically reverts to the position shown in FIGS. 4A and 4C. In accordance with the above, the electric valve assemblies 250, 450 are typically designed so that they are normally open or closed such that if they lose power they will automatically revert to a closed state, thereby providing the above-referenced fail safe.

Figure 5A:
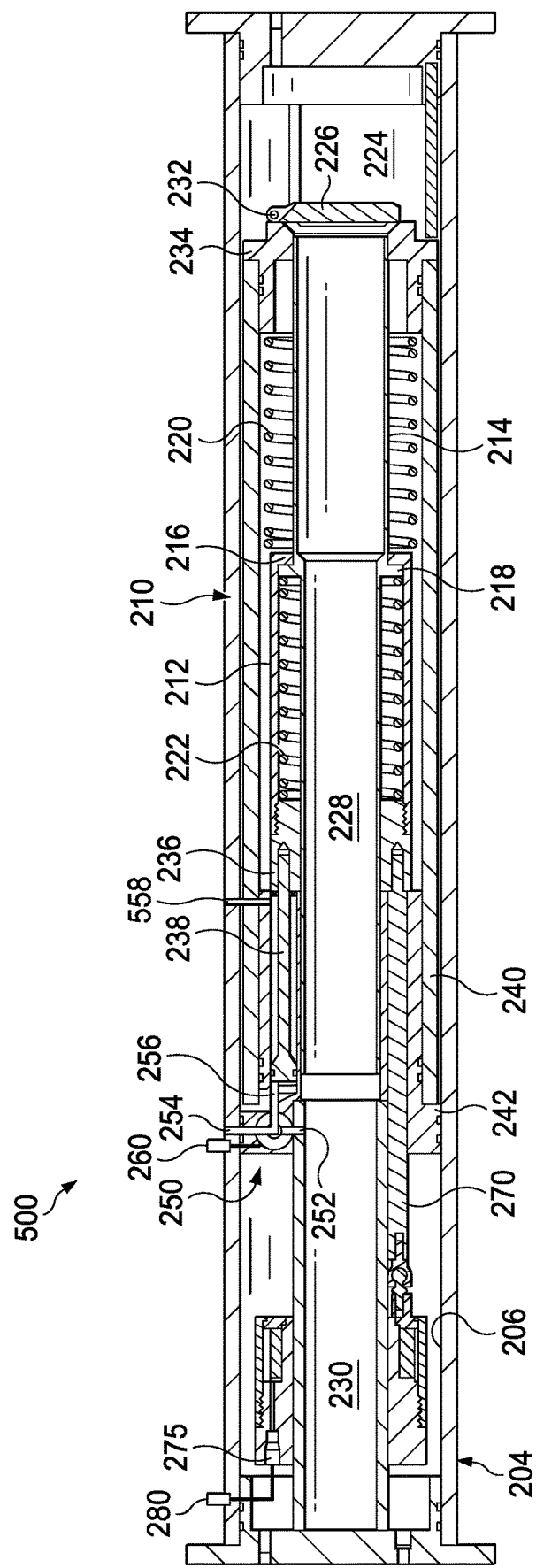
FIGS. 5A-5C illustrate different operational states of an alternative ESCSSV manufactured according to the principles of the present disclosure, as may be employed in FIG. 1.
Figure 5B:
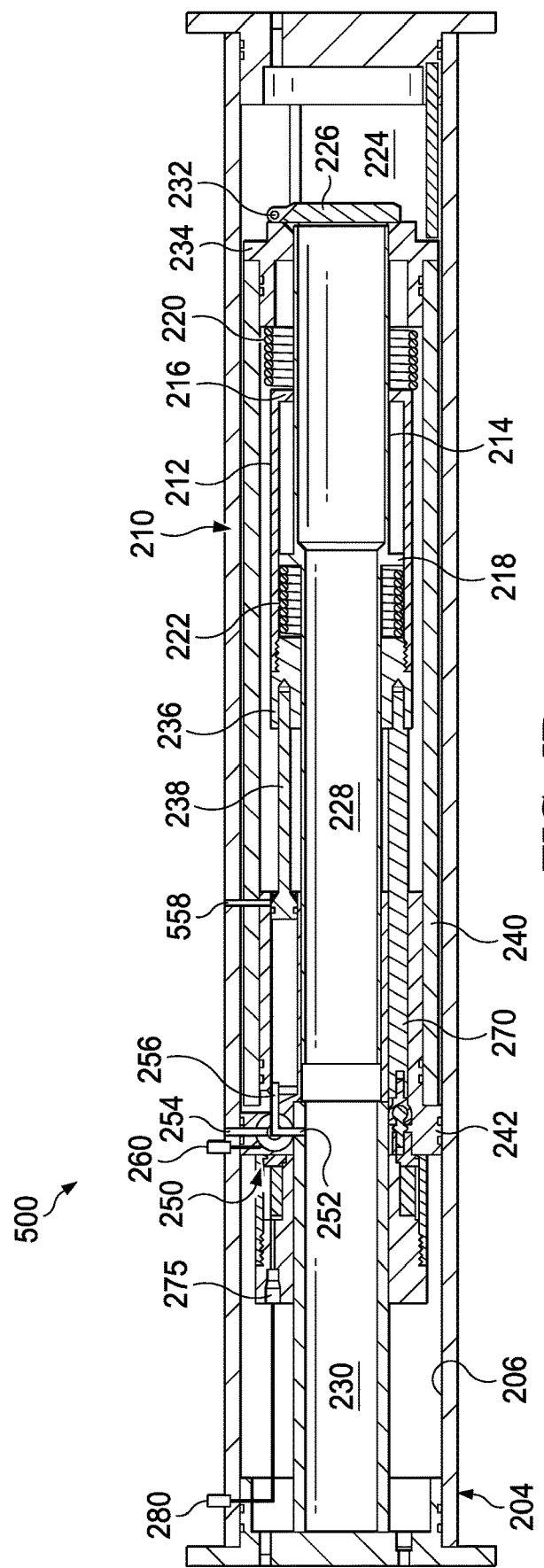
Figure 5C:
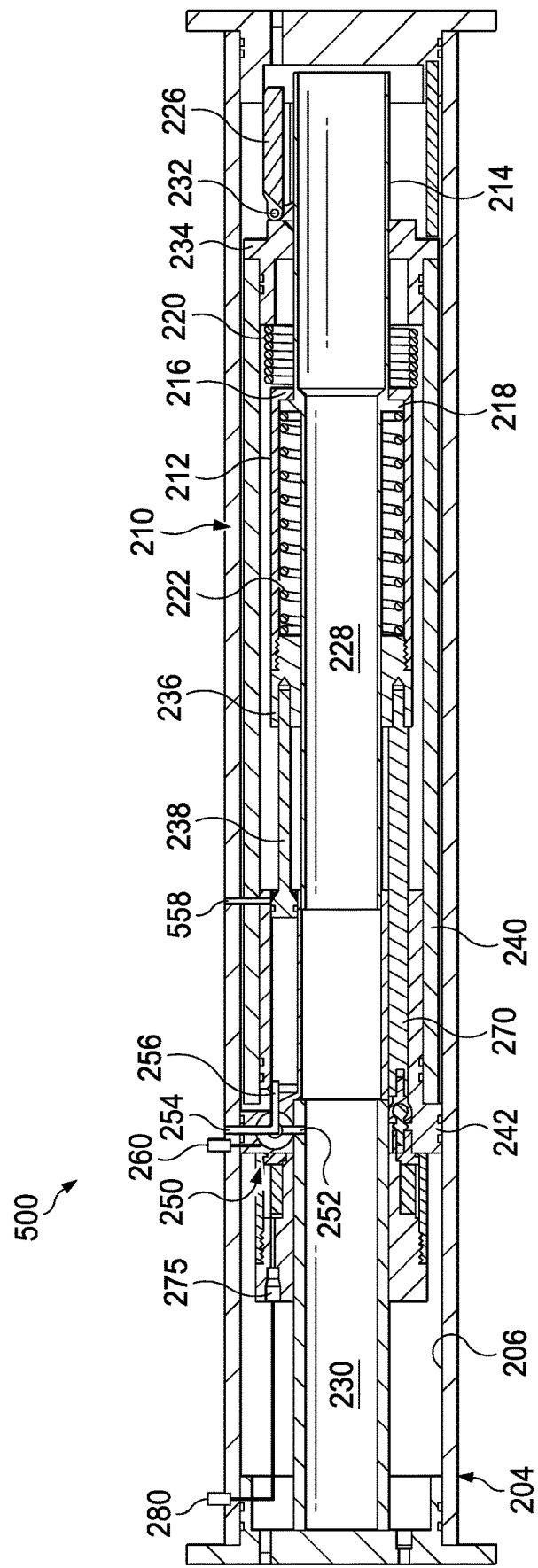

Turning briefly to FIGS. 5A-5C, illustrated is an alternative embodiment of an ESCSSV 500 according to the disclosure. The ESCSSV 500 is similar in many respects to the ESCSSV 200 of FIGS. 2A-2C. Accordingly, like reference numerals are used to reference similar (e.g., but not always identical) features. The ESCSSV 500 primarily differs from the ESCSSV 200, in that the ESCSSV 500 is configured for use with a higher section pressure and lower annulus pressure, wherein the opposite is true in the embodiment of FIGS. 2A-2C. Furthermore, wherein the ESCSSV 200 includes the lower piston channel 258 coupled to the section pressure, the ESCSSV 500 includes a lower piston channel 558 coupled to the annulus pressure. In accordance with this embodiment, the electric valve assembly 250 could move from a position wherein the upper piston channel 256 is coupled to the lower annulus pressure channel 255, and thus no differential pressure exists across the piston 238, as shown in FIG. 5A, to a position wherein the upper piston channel 256 is coupled to the higher section pressure via the section pressure channel 252, and thus a differential pressure exists across the piston 238, as shown in FIG. 2B.

Figure 6A:
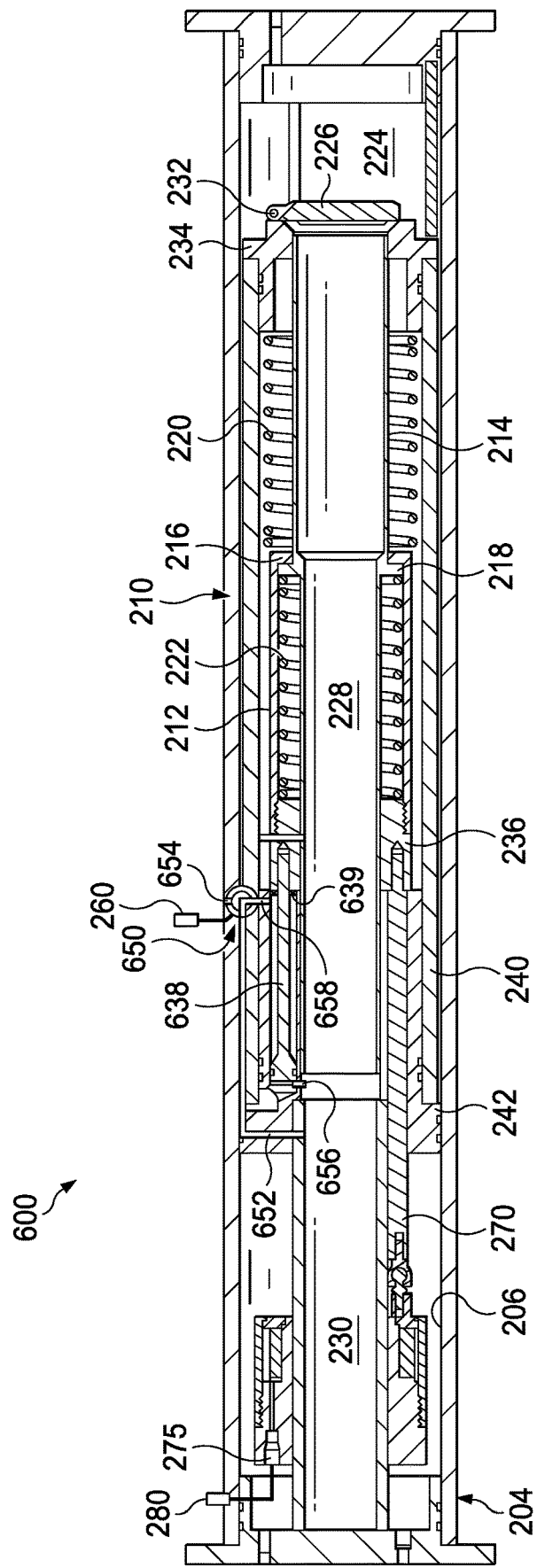
FIGS. 6A-6C illustrate different operational states of an alternative ESCSSV manufactured according to the principles of the present disclosure, as may be employed in FIG. 1.
Figure 6B:
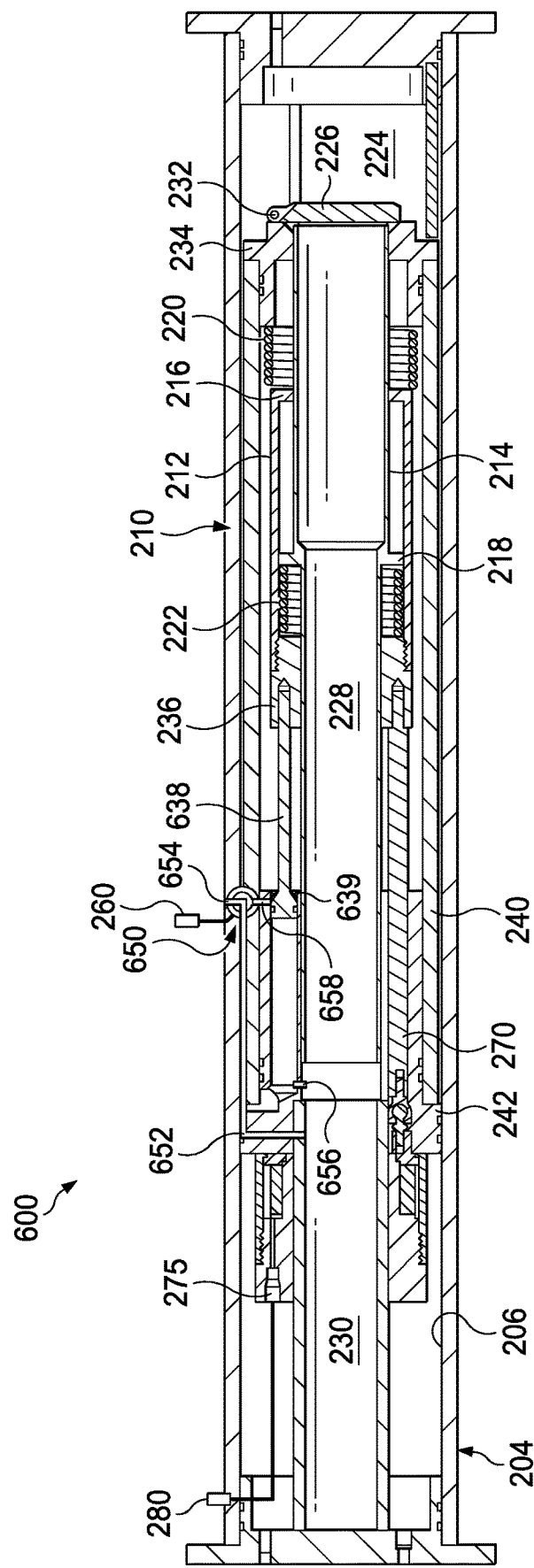
Figure 6C:
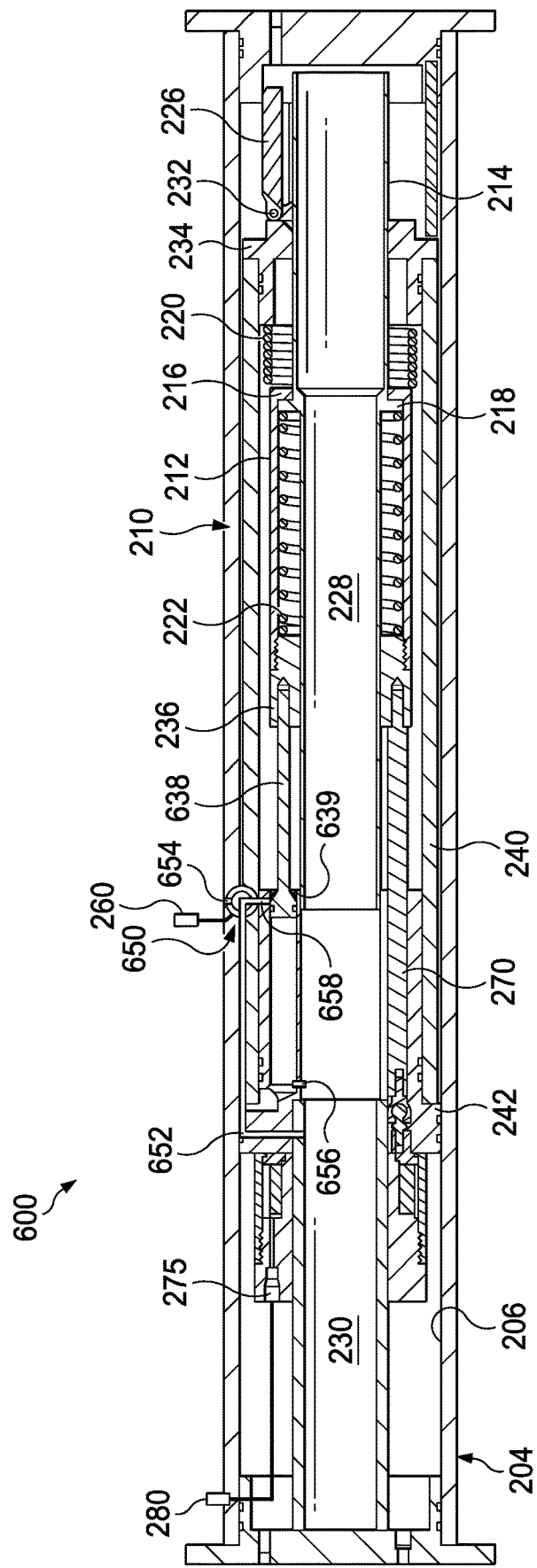

Turning briefly to FIGS. 6A-6C, illustrated is an alternative embodiment of an ESCSSV 600 according to the disclosure. The ESCSSV 600 is similar in many respects to the ESCSSV 500 of FIGS. 5A-5C, and thus is configured for a system with a higher section pressure than annulus pressure. Accordingly, like reference numerals are used to reference similar (e.g., but not always identical) features. The ESCSSV 600 primarily differs from the ESCSSV 500, in that the ESCSSV 600 employs a lower rod seal 639, and the electric valve assembly 650 switches between a section pressure and an annulus pressure below the piston. In this embodiment, the electric valve assembly 650, along with a section pressure channel 652, annulus pressure channel 654, upper piston channel 656, and lower piston channel 658, may be used to create the aforementioned force upon the piston 638. In accordance with this embodiment, the upper piston channel 656 is always coupled to the higher section pressure. Further to this embodiment, the electric valve assembly 650 could move from a position wherein the lower piston channel 658 is coupled to the higher section pressure channel 652, and thus no differential pressure exists across the piston 638, as shown in FIG. 6A, to a position wherein the lower piston channel 658 is coupled to the lower annulus pressure via the annulus pressure channel 654, and thus a differential pressure exists across the piston 638, as shown in FIG. 6B. FIG. 6C illustrates the ESCSSV 600 wherein the electric valve assembly 650 returns to the position of FIG. 6A, but the electromagnet assembly 275 retains the sliding sleeve 212 in the second position (e.g., as shown in FIG. 6B), at least until power is lost to the electromagnet assembly 275 or it is switched off.

A process control system may be utilized to monitor and control production of formation fluids from a well where the electrically actuated safety valve is disposed. A process control system may comprise components such as flowmeters, pressure transducers, pumps, power systems, and associated controls system for each. The process control system may provide power to the electrically actuated safety valve to turn on and off the electromagnet assembly therein. The electromagnet assembly may be designed to run off any power source such as alternating current ("A/C") or direct current ("D/C"). The process control system may allow an operator to open the electrically actuated safety valve by the methods described above by using the pump to reduce pressure, powering the electromagnet assembly, and using the pump to increase pressure. Wellbore fluid pressures and flow rates may be monitored by the process control system to ensure safe operating conditions and that the production process does not exceed safety limitations. Should a process upset occur such as an overpressure event, the process control system may detect the process upset and automatically cut power to the electrically actuated safety valve. As discussed above, cutting power to the electrically actuated safety valve may cause the electrically actuated safety valve to automatically close thereby containing pressures and fluids.

Aspects disclosed herein include:

A. An electrically surface-controlled subsurface safety valve, the electrically surface-controlled subsurface safety valve including an outer housing comprising a central bore extending axially through the outer housing, the central bore configured to convey subsurface production fluids there through, a valve closure mechanism disposed proximate a downhole end of the central bore, a bore flow management actuator disposed in the central bore and configured to move between a closed state and a flow state to engage or disengage the valve closure mechanism to determine a flow condition of the subsurface production fluids through the central bore, and an electric valve assembly fluidically coupled to the bore flow management actuator and configured to select between a section pressure or an annulus pressure to control the bore flow management actuator and determine the flow condition of subsurface production fluids through the central bore.

B. A method of operating an electrically surface-controlled subsurface safety valve, the method including providing an electrically surface-controlled subsurface safety valve, the surface-controlled subsurface safety valve including, an outer housing comprising a central bore extending axially through the outer housing, the central bore configured to convey subsurface production fluids there through, a valve closure mechanism disposed proximate a downhole end of the central bore, a bore flow management actuator disposed in the central bore and configured to move between a closed state and a flow state to engage or disengage the valve closure mechanism to determine a flow condition of the subsurface production fluids through the central bore, and an electric valve assembly fluidically coupled to the bore flow management actuator and configured to select between a section pressure or an annulus pressure, the method further including sending power to the electric valve assembly to select between the section pressure or the annulus pressure to control the bore flow management actuator and determine the flow condition of subsurface production fluids through the central bore.

C. A hydrocarbon production well, the well including a surface facility that is connected to receive subsurface production fluids from a production zone within a wellbore and provide power downhole, and an electrically surface-controlled subsurface safety valve disposed in the wellbore, the electrically surface-controlled subsurface safety valve including an outer housing comprising a central bore extending axially through the outer housing, the central bore configured to convey the subsurface production fluids there through, a valve closure mechanism disposed proximate a downhole end of the central bore, a bore flow management actuator disposed in the central bore and configured to move between a closed state and a flow state to engage or disengage the valve closure mechanism to determine a flow condition of the subsurface production fluids through the central bore, and an electric valve assembly fluidically coupled to the bore flow management actuator and configured to select between a section pressure or an annulus pressure to control the bore flow management actuator and determine the flow condition of subsurface production fluids through the central bore.

Aspects A, B, and C may have one or more of the following additional elements in combination:

Element 1: wherein the bore flow management actuator automatically moves to the closed state when power is lost to the electric valve assembly. Element 2: further including a piston coupled to the bore flow management actuator and operable to transmit a force thereto, and further wherein the electric valve assembly is fluidically coupled to the bore flow management actuator through the piston. Element 3: wherein the electric valve assembly is configured to select between the section pressure or the annulus pressure to create a pressure differential across an uphole portion and downhole portion of the piston. Element 4: wherein the pressure differential is configured to urge the piston downhole and move the bore flow management actuator toward the flow state. Element 5: wherein the bore flow management actuator includes a sliding sleeve disposed in the central bore and a flow tube disposed within the sliding sleeve. Element 6: wherein the sliding sleeve includes a sliding sleeve shoulder, the flow tube includes a flow tube shoulder, and wherein the flow tube shoulder is operable to engage the sliding sleeve shoulder to prevent the flow tube from moving beyond the sliding sleeve. Element 7: further including a power spring disposed between the sliding sleeve shoulder and a valve assembly, the power spring operable to provide a positive spring force against the sliding sleeve shoulder, and further including a nose spring disposed between the flow tube shoulder and a sliding sleeve assembly, the nose spring operable to provide a positive spring force against the flow tube shoulder. Element 8: further including an electromagnet assembly operable to move with the bore flow management actuator and fix the bore flow management actuator in the flow state regardless of whether the electric valve assembly selects the section pressure or the annulus pressure. Element 9: wherein the electromagnet assembly automatically releases the bore flow management actuator from the flow state to the closed state when power is lost thereto.

Those skilled in the art to which this application relates will appreciate that other and further additions, deletions, substitutions and modifications may be made to the described embodiments.

What is claimed is:

1. An electrically surface-controlled subsurface safety valve, comprising:
   an outer housing comprising a central bore extending axially through the outer housing, the central bore configured to convey subsurface production fluids there through;
   a valve closure mechanism disposed proximate a downhole end of the central bore;
   a bore flow management actuator disposed in the central bore and configured to move between a closed state and a flow state to engage or disengage the valve closure mechanism to determine a flow condition of the subsurface production fluids through the central bore; and
   an electric valve assembly fluidically coupled to the bore flow management actuator and configured to select between a section pressure or an annulus pressure to selectively apply a pressure differential across the bore flow management actuator to move the bore flow management actuator to the flow state and allow subsurface production fluids through the central bore when powered and automatically equalize pressure across the bore flow management actuator to allow the bore flow management actuator to move to the closed state and prevent the subsurface production fluids from traveling through the central bore when unpowered.

2. The electrically surface-controlled subsurface safety valve as recited in claim 1, further including a piston coupled to the bore flow management actuator and operable to transmit a force thereto, and further wherein the electric valve assembly is fluidically coupled to the bore flow management actuator through the piston.

3. The electrically surface-controlled subsurface safety valve as recited in claim 2, wherein the electric valve assembly is configured to select between the section pressure or the annulus pressure to create the pressure differential across an uphole portion and a downhole portion of the piston.

4. The electrically surface-controlled subsurface safety valve as recited in claim 3, wherein the pressure differential is configured to urge the piston downhole and move the bore flow management actuator toward the flow state.

5. The electrically surface-controlled subsurface safety valve as recited in claim 1, wherein the bore flow management actuator includes a sliding sleeve disposed in the central bore and a flow tube disposed within the sliding sleeve.

6. The electrically surface-controlled subsurface safety valve as recited in claim 5, wherein the sliding sleeve includes a sliding sleeve shoulder, the flow tube includes a flow tube shoulder, and wherein the flow tube shoulder is operable to engage the sliding sleeve shoulder to prevent the flow tube from moving beyond the sliding sleeve.

7. The electrically surface-controlled subsurface safety valve as recited in claim 6, further including a power spring disposed between the sliding sleeve shoulder and a valve assembly coupled to the valve closure mechanism, the power spring operable to provide a positive spring force against the sliding sleeve shoulder, and further including a nose spring disposed between the flow tube shoulder and a sliding sleeve assembly attached to the sliding sleeve, the nose spring operable to provide a positive spring force against the flow tube shoulder.

8. The electrically surface-controlled subsurface safety valve as recited in claim 1, further including an electromagnet assembly operable to move with the bore flow management actuator and fix the bore flow management actuator in the flow state regardless of whether the electric valve assembly selects the section pressure or the annulus pressure.

9. The electrically surface-controlled subsurface safety valve as recited in claim 8, wherein the electromagnet assembly automatically releases the bore flow management actuator from the flow state to the closed state when power is lost thereto.

10. A method of operating an electrically surface-controlled subsurface safety valve, comprising:
providing an electrically surface-controlled subsurface safety valve, the surface-controlled subsurface safety valve including;
an outer housing comprising a central bore extending axially through the outer housing, the central bore configured to convey subsurface production fluids there through;
a valve closure mechanism disposed proximate a downhole end of the central bore;
a bore flow management actuator disposed in the central bore and configured to move between a closed state and a flow state to engage or disengage the valve closure mechanism to determine a flow condition of the subsurface production fluids through the central bore; and
an electric valve assembly fluidically coupled to the bore flow management actuator and configured to select between a section pressure or an annulus pressure to selectively apply a pressure differential across the bore flow management actuator to move the bore flow management actuator to the flow state and allow subsurface production fluids through the central bore when powered and automatically equalize pressure across the bore flow management actuator to allow the bore flow management actuator to move to the closed state and prevent the subsurface production fluids from traveling through the central bore when unpowered; and
sending power to the electric valve assembly to select between the section pressure or the annulus pressure to control the bore flow management actuator and determine the flow condition of the subsurface production fluids through the central bore.

11. The method as recited in claim 10, further including a piston coupled to the bore flow management actuator and operable to transmit a force thereto, and further wherein the electric valve assembly is fluidically coupled to the bore flow management actuator through the piston.

12. The method as recited in claim 11, wherein the electric valve assembly selects between the section pressure or the annulus pressure to create the pressure differential across an uphole portion and a downhole portion of the piston.

13. The method as recited in claim 12, wherein the pressure differential urges the piston downhole and moves the bore flow management actuator toward the flow state.

14. The method as recited in claim 10, wherein the bore flow management actuator includes a sliding sleeve disposed in the central bore and a flow tube disposed within the sliding sleeve.

15. The method as recited in claim 14, wherein the sliding sleeve includes a sliding sleeve shoulder, the flow tube includes a flow tube shoulder, and wherein the flow tube shoulder is operable to engage the sliding sleeve shoulder to prevent the flow tube from moving beyond the sliding sleeve.

16. The method as recited in claim 15, further including a power spring disposed between the sliding sleeve shoulder and a valve assembly coupled to the valve closure mechanism, the power spring providing a positive spring force against the sliding sleeve shoulder, and further including a nose spring disposed between the flow tube shoulder and a sliding sleeve assembly attached to the sliding sleeve, the nose spring providing a positive spring force against the flow tube shoulder.

17. The method as recited in claim 10, further including an electromagnet assembly coupled with the bore flow management actuator, and further including sending additional power to the electromagnet assembly to fix the bore flow management actuator in the flow state regardless of whether the electric valve assembly selects the section pressure or the annulus pressure.

18. The method as recited in claim 17, wherein the electromagnet assembly automatically releases the bore flow management actuator from the flow state to the closed state when the additional power is lost thereto.

19. A hydrocarbon production well, comprising:
a surface facility that is connected to receive subsurface production fluids from a production zone within a wellbore and provide power downhole; and an electrically surface-controlled subsurface safety valve disposed in the wellbore, the electrically surface-controlled subsurface safety valve including;
an outer housing comprising a central bore extending axially through the outer housing, the central bore configured to convey the subsurface production fluids there through;
a valve closure mechanism disposed proximate a downhole end of the central bore;
a bore flow management actuator disposed in the central bore and configured to move between a closed state and a flow state to engage or disengage the valve closure mechanism to determine a flow condition of the subsurface production fluids through the central bore; and
an electric valve assembly fluidically coupled to the bore flow management actuator and configured to select between a section pressure or an annulus pressure to selectively apply a pressure differential across the bore flow management actuator to move the bore flow management actuator to the flow state and allow subsurface production fluids through the central bore when powered and automatically equalize pressure across the bore flow management actuator to allow the bore flow management actuator to move to the closed state and prevent the subsurface production fluids from traveling through the central bore when unpowered.

\* \* \* \* \*

UNITED STATES PATENT AND TRADEMARK OFFICE
CERTIFICATE OF CORRECTION

PATENT NO. : 11,643,905 B2
APPLICATION NO. : 16/524559
DATED : May 9, 2023
INVENTOR(S) : James Dan Vick, Jr., Jimmie Robert Williamson and Bruce Edward Scott Page 1 of 1

It is certified that error appears in the above-identified patent and that said Letters Patent is hereby corrected as shown below:

On the Title Page

After:
"Prior Publication Date
US 2020/0095843 A1 Mar. 26, 2020"
Insert:
--Foreign Application Priority Data
Sep. 20, 2018 WO ..........PCT/US2018/051968--

Signed and Sealed this
Twenty-first Day of October, 2025

John A. Squires
*Director of the United States Patent and Trademark Office*